June 26, 1951  J. R. FITZGERALD  2,558,077
COOKING DEVICE

Filed Aug. 19, 1946  2 Sheets-Sheet 1

JOHN R. FITZGERALD
INVENTOR
BY Lester B. Clark
Ray L. Smith
ATTORNEYS.

June 26, 1951 J. R. FITZGERALD 2,558,077
COOKING DEVICE
Filed Aug. 19, 1946 2 Sheets-Sheet 2

JOHN R. FITZGERALD
INVENTOR
BY Lester B. Clark
Ray L. Smith
ATTORNEYS.

Patented June 26, 1951

2,558,077

UNITED STATES PATENT OFFICE 2,558,077

COOKING DEVICE

John R. Fitzgerald, Harlingen, Tex.

Application August 19, 1946, Serial No. 691,520

4 Claims. (Cl. 99—336)

This invention relates to a cooking device, and more particularly to a device of this type in which the material being cooked is lifted from within a cooking medium after it has been immersed therein a predetermined interval of time.

An object of the invention is to provide a cooking device that will unfailingly remove the food from within the cooking medium at the end of a predetermined interval of cooking time.

Another object is to provide a cooking device that enables the cooking of independent batches of food, each of which will be independently removed from within the cooking medium at the end of the proper cooking interval.

Still another object is to provide a cooking device having a plurality of elements for lowering a food product into a cooking medium, and a common timing means for controlling such elements so that they will remove the product from the cooking medium at independently timed intervals.

Still another object is to provide a device of the type indicated that is simple in construction, easy to maintain and which will operate unfailingly over a long period of use.

The foregoing objects together with other objects and advantages of the invention will be more fully apparent from the following description considered in connection with the accompanying drawings in which.

Figure 1:
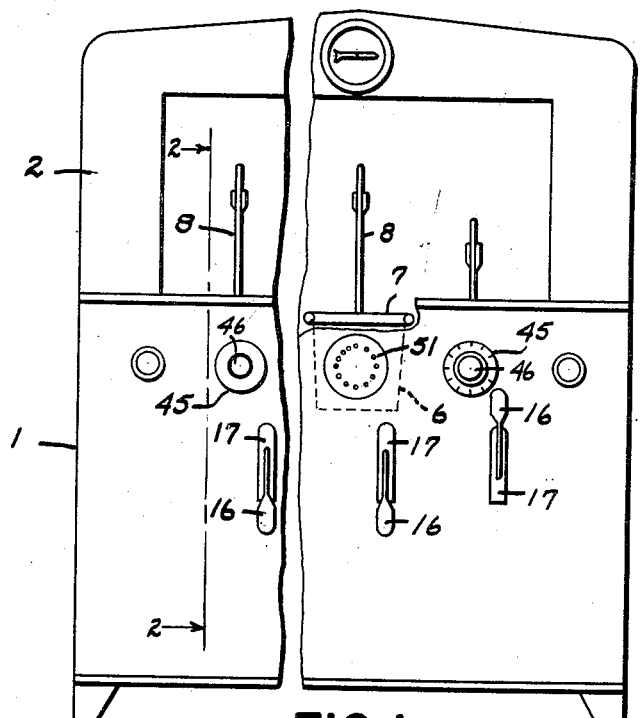
Fig. 1 is a partial front elevational view of a device embodying the invention, portions thereof being cut away so as to more clearly illustrate the device.

In the disclosed embodiment the device comprises a housing 1 having an upwardly extending back portion 2, a cooking vat 3 being supported within and extending longitudinally of the housing. A combustion chamber 4 below the vat 3 has a burner 5 therein, and it is intended that the heat generated from combustion within this chamber shall be imparted to a cooking medium such as a body of fat or oil within the vat 3.

Figure 2:
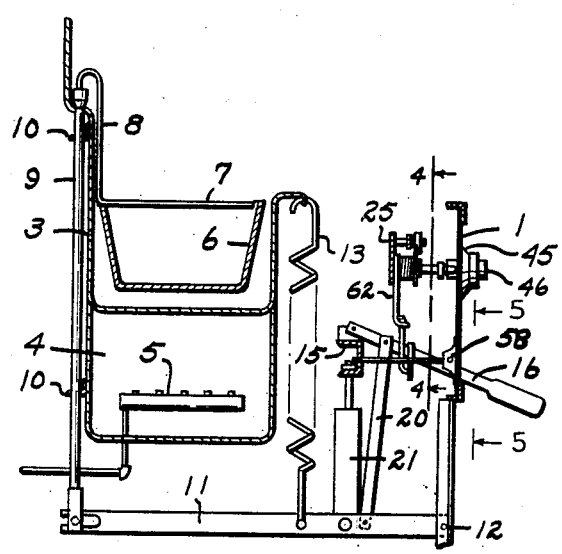
Fig. 2 is a transverse sectional view through the essential working elements of the device, such view taken substantially on line 2—2 in Fig. 1.

A plurality of containers or baskets 6 for a food product to be immersed and cooked in the cooking medium, are supported in holders 7 attached through upstanding portions 8 thereof to uprights 9 (Fig. 2) which are vertically slidable in the ears 10 at the rear of the vat 3 and the combustion chamber 4.

Inasmuch as the baskets 6 and the actuating mechanisms therefore are of like construction, reference will hereinafter be made to the individual assembly, it being understood that the structure described applies to all of such assemblies.

The lower end of the upright 9 is connected to the rear end of a lever 11 which is pivoted at 12 at its forward end within the housing 1. This lever is constantly urged upwardly by means of the tension spring 13 having its lower end attached to the lever, while its upper end is attached to a suitable support such as the forward portion of the vat 3. The spring 13 is placed under such tension that it will normally lift the holder 7 and associated elements to an elevated position whereby food within the container or basket 6 will be held in position above the cooking medium within the vat 3.

A longitudinal frame member 15 in the housing 1 provides a support for pivotal connection with the handle 16 which extends outwardly through the slot 17 in the front of the housing. A link 20 is pivotally attached at its opposite ends to this handle and to the lever 11 respectively, and it seems apparent that a downward thrust on the handle 16 is instrumental in moving the lever 11 downwardly and hence lowering the basket 6 into the cooking medium in the vat 3. As will be more fully described, means is provided for holding the arm 16 in a downward position during cooking intervals, and additional timed means is provided for releasing the arm for upward movement under the influence of the spring 13. In order that the rate of such movement of the lever 11 and associated elements shall be controlled, a dash-pot 21 is connected between the lever 11 and the frame member 15.

An important feature of the invention resides in the mechanism whereby the respective arms 16 are independently set and released at predetermined time intervals so that the associated basket 6 and the cooked food therein is lifted from within the cooking medium in the vat 3. Again, since these mechanisms are identical, reference is here made to the details of one such mechanism.

Figure 3:
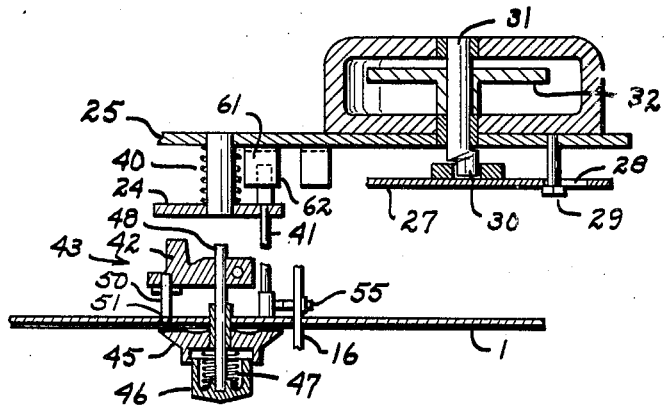
Fig. 3 is a horizontal sectional view taken on line 3—3 in Fig. 4.
Figure 4:
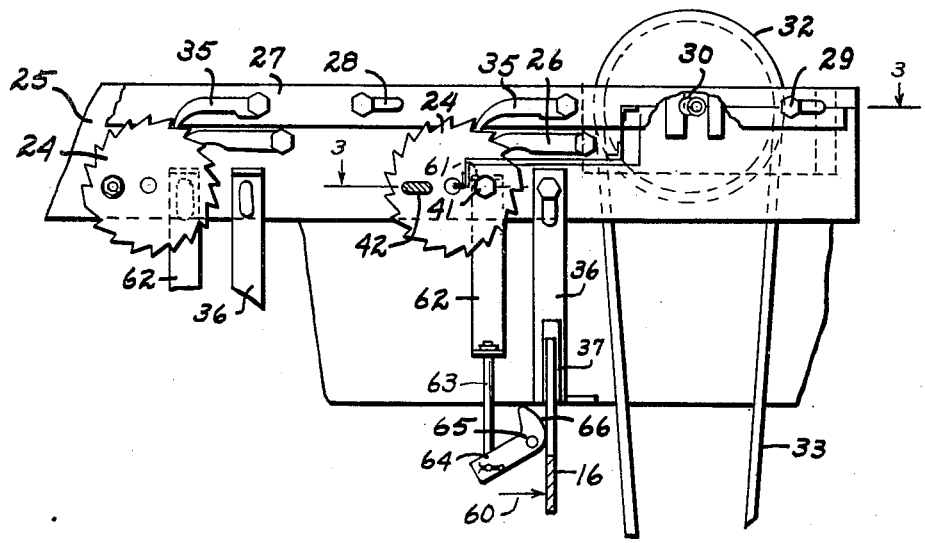
Fig. 4 is an elevational view taken on line 4—4 in Fig. 2.

As best seen in Figs. 3 and 4 a frame member 25 extends longitudinally of the housing 1 and has a ratchet wheel 24 mounted thereon at a point above and slightly to one side of the handle 16. This ratchet wheel is normally restrained from clockwise rotation by the stationary pawl 26 mounted on the frame member. A reciprocating bar 27, having slots 28 therein, is mounted upon the studs 29 secured in the frame member 25. This bar is reciprocated by means of the crank 30 on the shaft 31 driven at a time rate by the sprocket 32 and chain 33 from a suitable source of power (not shown).

The bar 27 carries driving pawl 35, directly above the stationary pawls 26, it being understood that the reciprocation of the bar and hence the movement of such pawl shall be such that the ratchet wheel 24 will be rotated through the angular extent of one tooth during a complete cycle of reciprocation of the bar. A link 36 directly beneath the pawl 26 is bifurcated at 37 at its lower end to straddle and extend upwardly from the handle 16 and to be lifted thereby to engage and successively lift the pawls 26 and 35 from engagement with the ratchet wheel 24. Such functioning occurs when the handle 16 rises under the influence of the spring 13 as heretofore explained. A torque spring 40 surrounding the shaft upon which the ratchet wheel 24 is mounted then rotates the ratchet wheel until a pin 41 on the forward face of the ratchet wheel engages stop 42 on the time setting mechanism 43 to be further described.

Each of the dials 45 on the front of the housing 1 includes a central knob 46 movable axially but non-rotatably with respect to the dial body. A spring 47 constantly urges this knob outwardly to carry the shaft 48 and the stop 42 with it so that the pin 50 carried by the stop enters a selected one of the plurality of openings 51 annularly arranged in the wall of the housing 1. The stop 42 can thus be set at any desired angular position about the axis of rotation of the dial 45.

Within the housing 1 the handle 16 is provided with a stud 55 (Fig. 5) which is stepped at 56 to form a surface for engagement with a complemental end upon the stud 57 secured upon ear 58 fixed within the housing 1. The edges of these studs are rounded at 59 so that they will override whereby the handle 16 is pushed to the right as indicated by the arrow 60 (Figs. 4 and 5) when the handle 16 is manually positioned downwardly. The resiliency of the handle will permit this movement to take place and will effect interlocking engagement of the studs whereby the handle is held in lowered position during the cooking interval.

The pin 41 on the ratchet wheel 24 includes a rearward projection (Fig. 3) which moves to engage the ear 61 on vertically movable link 62 which is connected through rod 63 to cam member 64 mounted upon pivot 65 alongside the handle 16. It seems apparent that lifting of the link 62, and hence rotation of the cam 64 upon its pivot, will cause the cam face 66 to push the handle in the direction indicated by the arrow 60 whereby the studs 55 and 57 are released from interengagement and the handle is thereby free to move upwardly to normal inoperative position. At such time, of course, the container or basket 6 and the contents thereof are lifted from within the cooking medium in the vat 3 and the link 36 is likewise lifted to release the pawls 26 and 35 so that the ratchet wheel 24 is returned to its initial position by the spring 40. It is to be understood, of course, that the dial 45 may be reset for any desired cooking interval preliminary to the succeeding actuation of the handle 16 to initiate the cooking of a food product thereby lowered in the container 6 into the cooking medium in the vat 3.

The operation of the device will be more apparent by following the mechanism through a complete cycle. It will be assumed that the basket 6 is in an elevated position and ready to be moved to a lowered position for a cooking cycle. When the basket is in such elevated position the handle 16 will of course be in its uppermost position and hence link 36 will be lifted by the handle and the pawls 26 and 35 will be lifted from engagement with the ratchet wheel 24, whereupon the ratchet wheel is rotated by the spring 40 until the pin 41 engages the stop 42. This permits the link 62 and associated cam 64 to return to initial position ready for a subsequent operation thereof.

If the time interval is to remain unchanged the device is ready for a cooking operation. It will be assumed, however, that a new timing is to be established in which case the knob 46 is pushed inwardly and pin 50 is withdrawn from an opening 51 in which it was previously positioned.

The knob is rotated to a selected time setting when the pin 50 enters the proper opening for the time setting.

It is understood that, as already explained, the bar 27 is constantly reciprocated by the crank 30 but that the ratchet wheel 24 is not rotated thereby when the pawls 26 and 35 are lifted.

Figure 5:
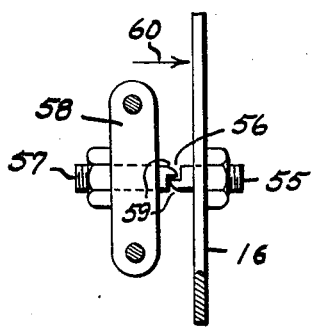
Fig. 5 is a detail showing the releasable latching connection with the operating handle whereby such handle is maintained in a predetermined position during the cooking interval.

The handle is next lowered to latching position as indicated in Fig. 5. This permits the link 36 to drop so that pawls 26 and 35 engage the ratchet wheel 24.

During the succeeding selected timed interval, the cam 24 rotates step-by-step and until the pin 41 engages the ear 61 or the link 62 and effects lifting of the latter. This rotates cam member 64 on its pivot and moves the lever 16 sidewardly sufficiently that studs 55 and 57 are disengaged, whereupon the lever 16 moves upwardly and the various elements are moved to starting position. Such operation of course, lifts the basket 6 and its contents from within the cooking medium in the vat 3.

Broadly the invention comprehends a cooking device of new and improved construction operable to lift a food material from within a cooking medium after such material has been immersed therein for a predetermined interval of time.

The invention claimed is:

1. In a cooking device wherein a container for a food to be cooked is lowered into a cooking medium, or frame, a handle pivotally mounted on said frame and operable to lower the container, releasable latching means for engaging and holding said handle in operated position, a ratchet wheel mounted on said frame, means normally tending to rotate said ratchet wheel in one direction, a stationary pawl mounted on said frame and engageable with the ratchet wheel to restrain the wheel against rotation by said means, a reciprocable pawl vertically spaced from said stationary pawl and for rotating said wheel step-by-step, and means engageable by the wheel for moving said handle sidewardly to release said latching means after the wheel has rotated through a predetermined angle.

2. In a cooking device wherein a container for a food to be cooked is lowered into a cooking medium, a frame, a handle pivotally mounted on said frame and operable to lower the container, releasable latching means for engaging and holding said handle in operated position, a time operated ratchet wheel, vertically spaced stationary and reciprocating pawls for rotating said wheel step-by-step, means engageable by the wheel for releasing said latching means after the wheel has rotated through a predetermined angle, and additional means operable by the movement of the handle for lifting the pawls from engagement with the ratchet wheel so that the wheel is retunable to initial position.

3. In a cooking device wherein a container for a food to be cooked is lowered into a cooking medium, a frame, means normally holding the container in elevated position, a handle pivotally mounted on said frame and operable to lower the container, releasable means engageable by the handle to hold the handle in operated position, a ratchet wheel mounted on said frame, tension means normally tending to rotate said wheel in one direction, a holding pawl engageable to restrain the ratchet wheel from such rotation, a reciprocable pawl for rotating the ratchet wheel step-by-step in the opposite direction, means operable by the ratchet wheel after a predetermined time interval to release said first mentioned means, and means for releasing said pawls whereby the ratchet wheel returns to a predetermined position.

4. In a device of the class described, a frame, a manually operable handle mounted thereon, a stationary stud mounted on the frame, a movable stud carried by the handle and adapted to releasably engage the stationary stud when the handle is moved to operated position a ratchet wheel mounted on the frame, torsion means normally tending to rotate said wheel in one direction, a projection on said wheel, an adjustable stop engageable by said projection for limiting rotation of the wheel by said torsion means, means for driving the wheel at a timed rate in the opposite direction, and means operable by the wheel for releasing the interengagement of said studs.

JOHN R. FITZGERALD.

REFERENCES CITED

The following references are of record in the file of this patent:

UNITED STATES PATENTS

| Number | Name | Date |
|---|---|---|
| 1,118,471 | Carlton | Nov. 24, 1914 |
| 1,376,531 | Greenwood | May 3, 1921 |
| 1,377,984 | Lamb | May 10, 1921 |
| 1,812,266 | Hummel et al. | June 30, 1931 |
| 1,923,590 | Schlemm | Aug. 22, 1933 |
| 2,036,049 | Ireland | Mar. 31, 1936 |
| 2,052,927 | Hallwood | Sept. 1, 1936 |
| 2,196,968 | Bemis | Apr. 16, 1940 |
| 2,243,953 | Graham | June 3, 1941 |
| 2,294,695 | Sardeson | Sept. 1, 1942 |
| 2,317,228 | Shroyer | Apr. 20, 1943 |
| 2,447,151 | Ascoli | Aug. 17, 1948 |
| 2,465,577 | Cox | Mar. 29, 1949 |